US010237828B2

(12) United States Patent
Park et al.

(10) Patent No.: US 10,237,828 B2
(45) Date of Patent: Mar. 19, 2019

(54) SELECTION OF AN ADC FOR EACH RF CHAIN OF A REMOTE RADIO HEAD UNIT (71) Applicant: Facebook, Inc., Menlo Park, CA (US)

(72) Inventors: Jeonghun Park, Austin, TX (US); Sungwoo Park, Austin, TX (US); Ali Yazdan Panah, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 244 days.

(21) Appl. No.: 15/294,691

(22) Filed: Oct. 15, 2016

(65) Prior Publication Data

US 2018/0110007 A1    Apr. 19, 2018

(51) Int. Cl.
*H04W 72/00*    (2009.01)
*H04W 52/02*    (2009.01)

(52) U.S. Cl.
CPC ... *H04W 52/0258* (2013.01); *H04W 52/0206* (2013.01); *H04W 52/0232* (2013.01); *Y02D 70/00* (2018.01)

(58) Field of Classification Search
CPC ............. H04W 52/0258; H04W 52/0232
See application file for complete search history.

(56) References Cited

U.S. PATENT DOCUMENTS

2017/0311183 A1* 10/2017 Cotanis ............... H04W 28/16
2017/0346579 A1* 11/2017 Barghi ................. H04B 17/336
2018/0007737 A1* 1/2018 Noriega ............... H04W 88/08
2018/0091108 A1* 3/2018 Zhao ..................... H04W 28/04
2018/0310230 A1* 10/2018 Niu ....................... H04W 76/14

OTHER PUBLICATIONS

R. H. Walden, "Analog-to-digital converter survey and analysis," IEEE Jour. Select. Areas in Comm., vol. 17, No. 4, pp. 539-550, Apr. 1999.
S. Jacobsson, G. Durisi, M. Coldrey, U. Gustavsson, and C. Studer, "Massive MIMO with low-resolution ADCs," CoRR, vol. abs/1602. 01139, 2016. [Online]. Available: http://arxiv.org/abs/1602.01139.
N. Liang and W. Zhang, "Mixed-ADC massive MIMO," IEEE Jour. Select. Areas in Comm., vol. 34, No. 4, pp. 983-997, Apr. 2016.

(Continued)

*Primary Examiner* — Jeffrey M Rutkowski
*Assistant Examiner* — Voster Preval
(74) *Attorney, Agent, or Firm* — Brian R Short (57) ABSTRACT

Apparatuses, methods, and systems for selecting an ADC for each RF chain of an RRU are disclosed. One embodiment of the RRU includes a plurality of antennas and a plurality of RF chains configured to receive a plurality of wireless signals, A plurality of outputs of the RRU connected to a front-haul, wherein the front-haul electrically connects the plurality of outputs of the RRU to a baseband unit (BBU), wherein each of the outputs is connected to an output of one of a plurality of ADCs. Further, the RRU selects a one of the plurality of ADCs having the plurality of ADC resolutions for each of the RF chains based on the capacity of the front-haul, a channel gain of each of the RF chains, and a performance parameter of the RRU. A switch connects each of the RF chains to a corresponding one of the plurality of ADCs.

20 Claims, 7 Drawing Sheets (56) References Cited

OTHER PUBLICATIONS

J. Choi, J. Mo, and R. W. Heath, "Near maximum-likelihood detector and channel estimator for uplink multiuser massive MIMO systems with one-bit ADCs," IEEE Trans. Comm., vol. 64, No. 5, pp. 2005-2018, May 2016.
T. Zhang, C. Wen, S. Jin, and T. Jiang, "Mixed-adc massive MIMO detectors: Performance analysis and design optimization," submitted to IEEE Trans. Wireless Comm., vol. abs/1509.07950, 2015. [Online]. Available: http://arxiv.org/abs/1509.07950.
A. Mezghani, M. seifeddine Khoufi, and J. A. Nossek, "A modified MMSE receiver for quantized MIMO systems," in Proc. Int. ITG Workshop Smart Antennas (WSA), 2007.
J. Mo, P. Schniter, N. G. Prelcic, and R. W. Heath, "Channel estimation in millimeter wave MIMO systems with one-bit quantization," in Proc. of Asilomar Conf. on Sign., Syst. and Computers, Nov. 2014, pp. 957-961.
J. Max, "Quantizing for minimum distortion," IRE Transactions on Information Theory, vol. 6, No. 1, pp. 7-12, Mar. 1960.
A. Mezghani and J. A. Nossek, "Analysis of 1-bit output noncoherent fading channels in the low SNR regime," in Proc. IEEE Int. Symp. Info. Th., Jun. 2009, pp. 1080-1084.
A. Mezghani and J. A. Nossek, "Analysis of Rayleigh-fading channels with 1-bit quantized output," in Proc. IEEE Int. Symp. Info. Th., 2008, pp. 260-264.
A. Mezghani and J. A. Nossek, "On ultra-wideband MIMO systems with 1-bit quantized outputs: Performance analysis and input optimization," in Proc. IEEE Int. Symp. Info. Th., Jun. 2007, pp. 1286-1289.
J. Mo, A. Alkhateeb, S. Abu-Surra, and R. W. H. Jr., "Hybrid architectures with few-bit ADC receivers: Achievable rates and energy-rate tradeoffs," submitted to IEEE Trans. Wireless Comm., 2016. [Online]. Available: http://arxiv.org/abs/1605.00668.
W. Liu, S. Han, and C. Yang, "Is massive MIMO energy efficient?" CoRR, 2015. [Online]. Available: http://arxiv.org/abs/1505.07187.
T. L. Marzetta, "Noncooperative cellular wireless with unlimited numbers of base station antennas," IEEE Trans. Wireless Comm., vol. 9, No. 11, pp. 3590-3600, Nov. 2010.
H. Q. Ngo, E G. Larsson, and T. L. Marzetta, "Energy and spectral efficiency of very large multiuser MIMO systems," IEEE Trans. Comm., vol. 61, No. 4, pp. 1436-1449, Apr. 2013.
G. W. Stewart, "On the continuity of the generalized inverse," SIAM J. on Appl. Math., vol. 17, No. 1, pp. 33-45, 1969.

\* cited by examiner

SELECTION OF AN ADC FOR EACH RF CHAIN OF A REMOTE RADIO HEAD UNIT

FIELD OF THE DESCRIBED EMBODIMENTS

The described embodiments relate generally to wireless communications. More particularly, the described embodiments relate to systems, methods and apparatuses for selecting an ADC (analog to digital converter) for each RF (radio frequency) chain of a remote radio head unit.

BACKGROUND

C-RAN (Cloud-RAN (Radio Access Network)), sometimes referred to as Centralized-RAN, is a proposed architecture for cellular networks. C-RAN is a centralized, cloud computing-based architecture for radio access networks that supports 2G, 3G, 4G and future wireless communication standards. Its name comes from the four 'C's in the main characteristics of C-RAN system, "Clean, Centralized processing, Collaborative radio, and a real-time Cloud Radio Access Network".

Compared to a traditional cellular network, a C-RAN has a different system structure, where distributed RF (radio frequency) units called remote radio head (RRH) receive the signals and sends the signals to a centralized baseband unit (BBU) via front-haul. To minimize the installation cost of a RRH, the RRH is equipped with light hardware and the RRU can be deployed without a wired power supply (e.g., internet.org project). These features put more power constraint on a C-RAN than a traditional BS.

It is desirable to have methods apparatuses, and systems for reducing power consumption of a remote radio head unit by selecting an ADC (analog to digital converter) for each RF (radio frequency) chain of a remote radio head unit.

SUMMARY

An embodiment includes a remote radio head unit (RRU). The RRU includes a plurality of antennas connected to a plurality of RF (radio frequency) chains configured to receive a plurality of wireless signals, a plurality of analog-to-digital converters (ADCs) having a plurality of ADC resolutions. The RRU further includes a plurality of outputs of the RRU connected to a front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul. Further, the RRU includes a controller configured to select a one of the plurality of ADCs having the plurality of ADC resolutions for each of the plurality of RF chains based on the capacity of the front-haul, a channel gain of each of the plurality RF chains, and a performance parameter of the RRU, and a switch that connects each of the plurality of RF chains to the corresponding selected one of the plurality of ADCs. For an embodiment, the performance parameter includes at least one of a spectral efficiency of the received plurality of wireless signals, or an energy efficiency of bits per unit of energy of the RRU.

Another embodiment includes cloud radio access network (RAN) system. The RAN system includes a central baseband unit (BBU), and a plurality of remote radio heads (RRUs). Each RRU is configured to receive wireless communication signals and communicate the wireless communication signals to the BBU through a front-haul. For an embodiment, one or more of the plurality of RRUs includes a plurality of antennas connected to a plurality of N RF (radio frequency) chains configured to receive a plurality of wireless signals, a plurality of analog-to-digital converters (ADCs) having a plurality of ADC resolutions. The RRU further includes a plurality of outputs of the RRU connected to a front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul. Further, the RRU includes a controller configured to select a one of the plurality of ADCs having the plurality of ADC resolutions for each of the plurality of RF chains based on the capacity of the front-haul, a channel gain of each of the plurality RF chains, and a performance parameter of the RRU, and a switch that connects each of the plurality of RF chains to the corresponding selected one of the plurality of ADCs. For an embodiment, the performance parameter includes at least one of a spectral efficiency of the received plurality of wireless signals, or an energy efficiency of bits per unit of energy of the RRU.

Another embodiment includes a method. The method includes receiving, by a plurality of antennas connected to a plurality of RF (radio frequency) chains of a remote radio head unit (RRU), a plurality of wireless signals, selecting a one of the plurality of ADCs having the plurality of ADC resolutions for each of the plurality of RF chains based on the capacity of the front-haul, a channel gain of each of the plurality RF chains, and a performance parameter of the RRU, and connecting, through switches, each of the plurality of RF chains to a corresponding selected one of the plurality of ADCs, connecting each of the selected ADCs to a plurality of outputs of the RRU, wherein the plurality of outputs of the RRU are connected to the front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for selecting an ADC (analog to digital converters) from a plurality of ADCs for each RF (radio frequency) chain of a remote radio head unit.

At least some embodiments include a mixed-ADC multi-antenna system for cloud-RAN deployments. For an embodiment of the mixed-ADC multi-antenna system, a single user equipped with a single antenna transmits a signal to a multi-antenna remote radio head (RRH). For an embodiment, the RRH includes a mixed-ADC pool that includes multiple ADC units, where at any given time a subset of the ADC units is dynamically used to quantize the analog signal received at each antenna chain of each of the multi-antenna of the RRH. The quantized signals are communicated to a centralized processing unit via capacity limited front-haul. For an embodiment, the ADCs are selected for maximizing the spectral efficiency (SE) and the energy efficiency (EE) of the wireless system. For an embodiment, this includes adopting an information-theoretic tool of generalized mutual information (GMI) and a pseudo-quantization noise model. Assuming low SNR (signal to noise ratio) of the received signals, the GMI is approximated as a function of relevant system parameters, such as, the resolution bit of the ADC used at each antenna chain and the channel gain of each antenna chain. An embodiment includes maximizing SE and the EE by selecting ADCs based at least in part on the channel gain and the front-haul capacity.

In an attempt to reduce the power consumption of a wireless communication system, a low resolution ADC has been considered an efficient solution based on the fact that the ADC is one of the most power-consuming devices of a receiver. Since the ADC power consumption exponentially increases with resolution bits, using low resolution ADCs decreases the power drastically, while the performance loss due to the low resolution can be compensated by using many antennas in massive MIMO systems.

As previously stated, compared to a traditional cellular network, a C-RAN has a unique system structure, where distributed RF units called remote radio head (RRH) receives the signals and sends them to a centralized baseband unit (BBU) via front-haul. To minimize the installation cost of a RRH, a RRH tends to be equipped with a light hardware and it can be also deployed even without wired power supply. These features put more power constraint on a C-RAN than a traditional BS (base station), which makes a low resolution ADC attractive in a C-RAN.

At least some of the described embodiments include a low resolution ADC switch within a massive MIMO C-RAN. For at least some of the described embodiments, the RRH includes a low resolution ADC pool, which includes a plurality of various low resolution ADCs and an ADC switch. The ADC switch connects to each antenna (RF chain) to the selected ADC, so that each antenna can have a different resolution ADC. By using a connected ADC, each antenna quantizes the signal transmitted by a single antenna user and sends it to a centralized BBU via capacity-limited front-haul.

At least some embodiments include characterizing the performance as a function of the channel gain and the ADC resolution bits for each antenna in a low signal-to-noise (SNR) regime. Based on the characterized performance, processes for maximizing (or at least improving) the SE and EE can be used to determine which ADC of the pool or a plurality of ADCs should be connected to an antenna depending on the channel condition.

Proposed embodiments can be determined and verified by simulation. For the spectral efficiency (SE), selecting the ADC resolution proportional to the channel gain is beneficial, while for the energy efficiency (EE), balancing the ADC resolution can be beneficial. That is, selecting the ADC resolution to reduce the gap between the maximum and the minimum resolution bits is advantageous.

Figure 1:
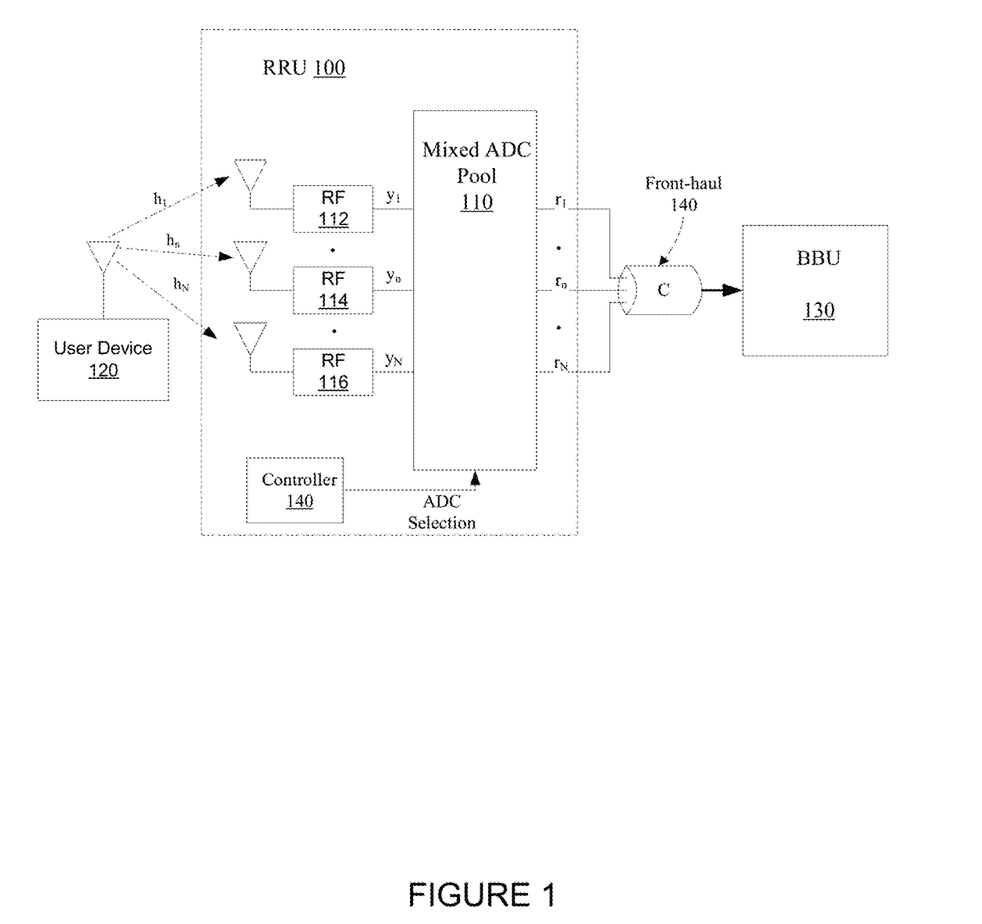
FIGS. 1 shows a cloud radio access network (RAN) system, according to an embodiment.

FIGS. 1 shows a cloud radio access network (C-RAN) system, according to an embodiment. A user device 120 forms a wireless uplink with a remote radio head (RRH) 100 of a C-RAN system. The RRH 100 includes N antennas, N RF chains (112, 114, 116) and a mixed-resolution ADC pool 110. The ADC pool 110 of the RRH 100 includes multiple ADC units, where at any given time a subset of the multiple ADC units is dynamically used to quantize the analog inputs ($y_l$, $y_n$, $y_N$) of the RF chains (112, 114, 116). For an embodiment, the connection between the received analog signals of the antennas and the selected ADCs of the ADC pool 110 is formed by a virtual switch of the mixed ADC pool 110, so that the connected ADCs can be changed dynamically depending on a system conditions by this switch.

As shown, the plurality of antennas are connected to the plurality of N RF (radio frequency) chains 112, 114, 116 and configured to receive a plurality of wireless signals;

As shown and described, the plurality of analog-to-digital converters (ADCs) within the mixed ADC pool 110 have a plurality of ADC resolutions.

A plurality of N outputs ($r_l$, $r_n$, $r_N$) of the RRU are connected to a front-haul 140, wherein the front-haul 140 electrically connects the plurality of N outputs ($r_l$, $r_n$, $r_N$) of the RRU to a baseband unit (BBU) 130, wherein each of the N outputs is connected to an output of one of the plurality of ADCs. The front-haul 140 has a capacity that indicates a bit-rate of the front-haul.

A controller 150 of the RRU 110 is configured to select a one of the plurality of ADCs having the plurality of ADC resolutions for each of the N RF chains based on the capacity of the front-haul, a channel gain of each of the N RF chains, and a performance parameter of the RRU.

For an embodiment, the performance parameter includes a spectral efficiency of the received plurality of wireless signals. For at least some embodiments, spectral efficiency refers to the information rate that can be transmitted over a given bandwidth in a specific communication system. It is a measure of how efficiently a limited frequency spectrum is utilized by the physical layer protocol, and sometimes by the media access control (the channel access protocol).

For an embodiment, the performance parameter includes an energy efficiency of bits per unit of energy of the RRU.

Figure 2:
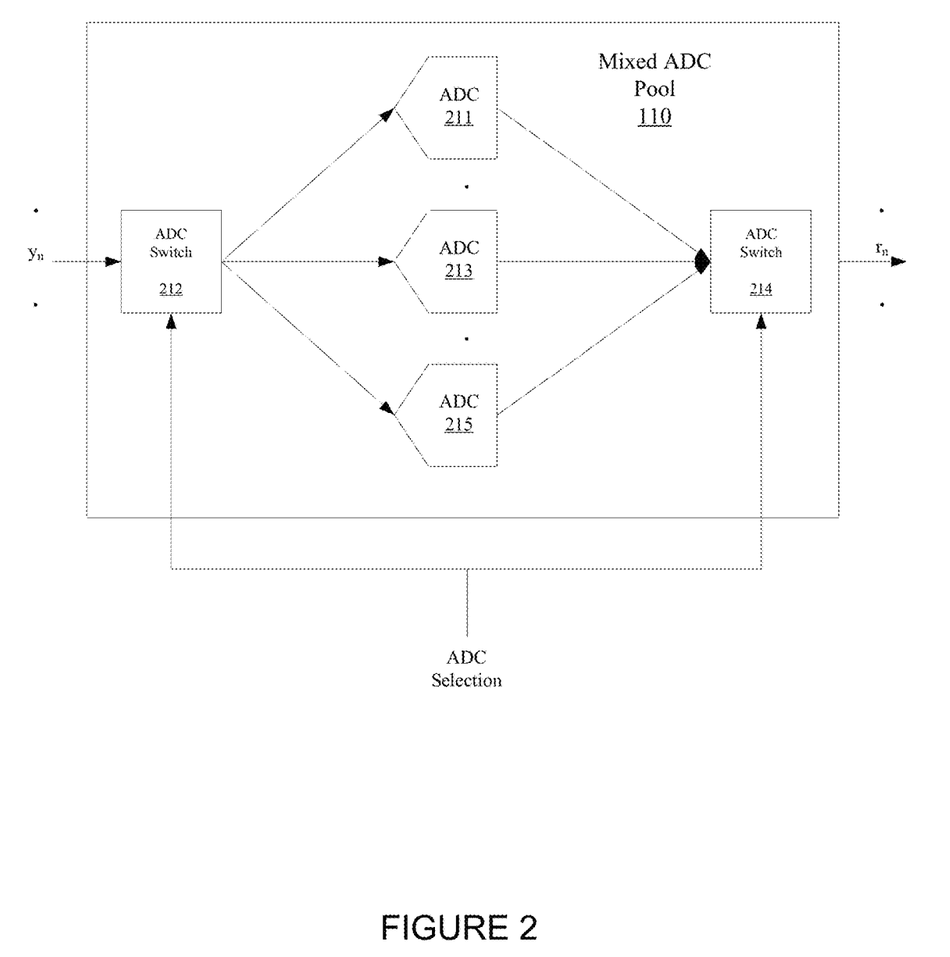
FIG. 2 shows a mixed ADC pool of an RRU, according to an embodiment.

FIG. 2 shows a mixed ADC pool of an RRU 100, according to an embodiment. The previously described virtual switch 212 connected each of the N RF chains to the selected ADC 211, 213 or 215. Further, an ADC switch 214 connects the selected ADC to a one of the outputs ($r_n$) of the RRU 100.

As shown and described, for an embodiment, selecting the one of the plurality of ADCs based on the capacity of the front-haul, the channel gain of each of the plurality of RF chains, and the spectral efficiency of the received plurality of wireless signals, includes selecting an ADC having the highest resolution for a one of the plurality of RF channels corresponding with the strongest received signal. Alternatively, for an embodiment, selecting the one of the plurality of ADCs based on the capacity of the front-haul, the channel gain of each of the plurality of RF chains, and the spectral efficiency of the received plurality of wireless signals, includes selecting a higher resolution ADC for a one of the plurality of RF chains that has a stronger received signal than a received signal of another one of the plurality of RF chains. That is, generally, the spectral efficiency is enhanced or improved by selecting a higher resolution ADC for the RF chain having the strongest or a stronger received signal than the received signal level of other of the RF chains.

As shown and described, for an embodiment, selecting the one of the plurality of ADCs based on the capacity of the front-haul, the channel gain of each of the plurality of RF chains, and the energy efficiency of bits per unit of energy of the RRU, includes selecting a resolution of an ADC for at least one of the RF chains based at least in part on a ratio of channel bandwidth times spectral efficiency to power consumed by the ADC.

Figure 3:
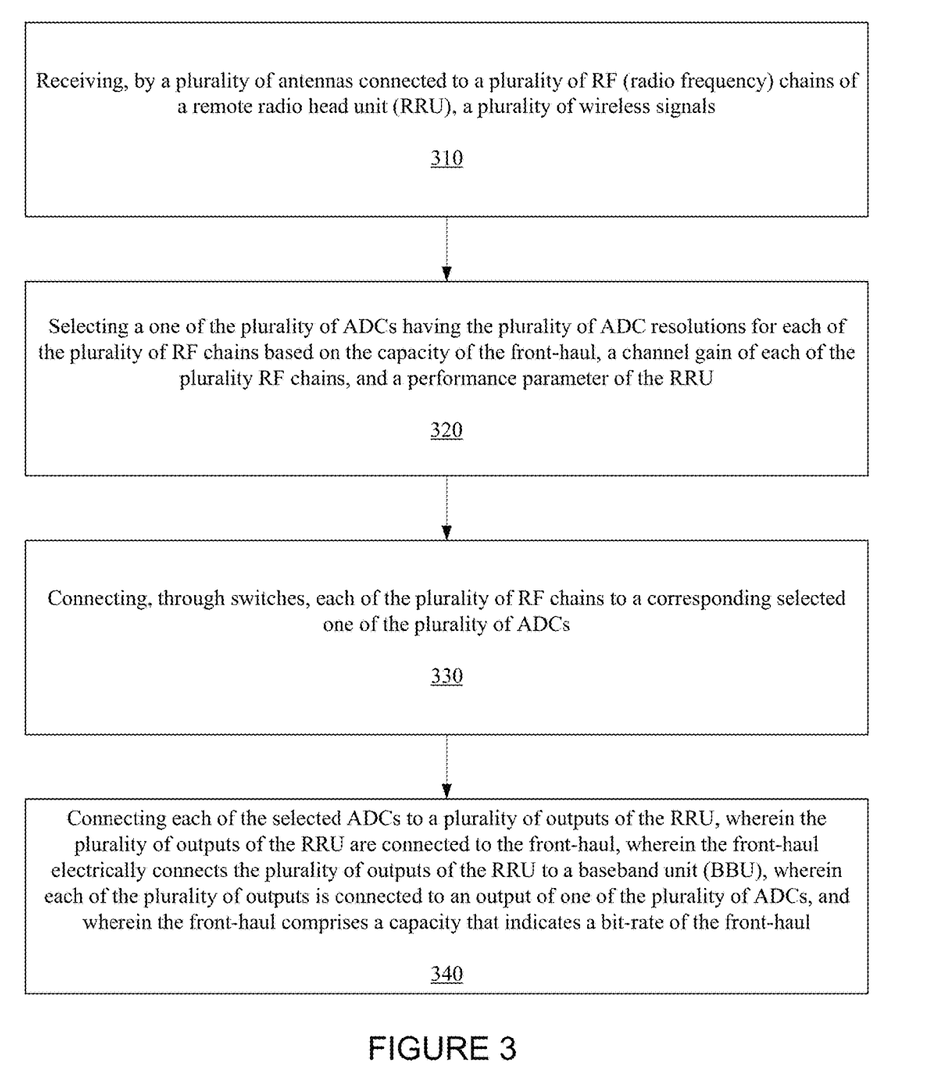
FIG. 3 is a flow chart that includes steps of a method selecting ADCs (analog to digital converters) for each RF (radio frequency) chain of a remote radio head unit, according to an embodiment.

FIG. 3 is a flow chart that includes steps of a method selecting ADCs (analog to digital converters) for each RF (radio frequency) chain of a remote radio head unit, according to an embodiment. A first step 310 includes receiving, by a plurality of antennas connected to a plurality of RF (radio frequency) chains of a remote radio head unit (RRU), a plurality of wireless signals. A second step 320 includes selecting a one of the plurality of ADCs having the plurality of ADC resolutions for each of the plurality of RF chains based on the capacity of the front-haul, a channel gain of each of the plurality RF chains, and a performance parameter of the RRU. A third step 330 includes connecting, through switches, each of the plurality of RF chains to a corresponding selected one of the plurality of ADCs. A fourth step 340 includes connecting each of the selected ADCs to a plurality of outputs of the RRU, wherein the plurality of outputs of the RRU are connected to the front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul.

As previously described, for an embodiment, the performance parameter of the RRU includes a spectral efficiency of the received plurality of wireless signals. As previously described, for an embodiment, selecting the one of the plurality of ADCs based on the capacity of the front-haul, the channel gain of each of the plurality of RF chains, and the spectral efficiency of the received plurality of wireless signals, includes selecting an ADC having the highest resolution for a one of the plurality of RF channels corresponding with the strongest received signal. As previously described, for an embodiment, selecting the one of the plurality of ADCs based on the capacity of the front-haul, the channel gain of each of the plurality of RF chains, and the spectral efficiency of the received plurality of wireless signals, includes selecting a higher resolution ADC for a one of the plurality of RF chains that has a stronger received signal than a received signal of another one of the plurality of RF chains.

As previously described, for an embodiment, the performance parameter of the RRU includes an energy efficiency of bits per unit of energy of the RRU. As previously described, for an embodiment, selecting the one of the plurality of ADCs based on the capacity of the front-haul, the channel gain of each of the plurality of RF chains, and the energy efficiency of bits per unit of energy of the RRU, includes selecting a resolution of an ADC for at least one of the RF chains based at least in part on a ratio of channel bandwidth times spectral efficiency to power consumed by the ADC.

For the following descriptions and analysis, bold uppercase and lowercase letters represent matrices and vectors, respectively. For an arbitrary vector x, xi denotes the i-th element. $X^T$ and $X^*$ denote the transpose and conjugated-transpose of the matrix X and $[X]_{ij}$ denotes the element in the i-th row and j-th column. $\mathbb{E}_x[\cdot]$ is the expectation value with regard to the random variable x and the cross-correlation matrix $R_{xy}$ is defined as $[R_{xy}]_{i,j} = \mathbb{E}_{xy}[x_i y_j^*]$. $\mathcal{R}(\mathcal{Y}_n)$ and $I(\mathcal{Y}_n)$ denote the real and the imaginary parts of a complex variable x, respectively. For any X and Y, X∘Y is the Hadamard product such that $[X \circ Y]_{i,j} = [X]_{i,j} \times [Y]_{i,j}$. Finally, $\text{diag}(x_i; \ldots; x_N)$ is an N×N diagonal matrix from the elements $\{x_i; \ldots; x_N\}$ and $1_N$ is an N×1 vector of all 1s.

Quantization

As described, the quantized signals from the RRH 100 are transmitted to the BBU 130 through the front-haul pipe 140 that has a capacity that is limited to C. Denoting the resolution of the selected ADC for the nth antenna chain as $b_n \in \{1, 2, \ldots\}$ and the collection of N ADCs by the vector $b = [b_1, b_2, \ldots, b_N]^T$, the front-haul constraint is $\sum_{n=1}^{N} b_n \leq C$, i.e. $b^T 1_N \leq C$.

This system model includes two unique features: i) The ADC resolution of the system model of the described embodiments includes arbitrary resolution ADCs, i.e. $b_n \in \{1, 2, \ldots\}$. ii) The system of the described embodiments includes a capacity limited front-haul pipe that enforces an upper bound on the total ADC resolution bits.

Letting x denote the random transmit symbol from the signal-antenna user in FIG. 1 such that $\mathbb{E}_\omega[|X|^2] = P$, the received baseband analogue signal at the RRH is;

$$\mathcal{Y}_n = h_n X + \mathcal{Z}_n \quad (1)$$

$n = 1, 2, \ldots, N$, where $\mathcal{Z}_n \sim \mathcal{CN}(0, 1)$ is additive white Gaussian noise (AWGN) and $h_n$ is the channel coefficient between the user and the nth antenna (assumed to be known perfectly at the RRH). Each antenna branch at the RRH is connected to a single ADC that is mathematically modeled as a quantization function $Q_{b_n}(\cdot)$ with $b_n$ bits of resolution, $2^{b_n}+1$ threshold values (including $-\infty$ and $\infty$), and $2^{b_n}$ quantization values. By denoting the kth threshold value as $\Delta_k$ and the kth quantization value as $\delta_k$ and defining $Q_{b_n}(x) = \delta_k$, for $\Delta_k \leq X < \Delta_{k+1}$. This function acts separately on the real and imaginary parts of $\mathcal{Y}$ to give;

$$r_n = \mathcal{R}(r_n) + jI(r_n) = Q_{b_n}(\mathcal{R}(\mathcal{Y}_n)) + j Q_{b_n}(I(\mathcal{Y}_n)), j = \sqrt{-1}. \quad (2)$$

To further characterize the quantized signal $r_n$, adopt a pseudo-quantization noise (PQN) model is adopted such that: $r_n = \mathcal{Y}_n + q_n$, where $q_n$ is the quantization noise. Assuming an optimal scalar quantizer, i.e. one that minimizes the mean square error between the input and the output, the statistics of $q_n$ can be modeled using the following correlation properties from;

$$\mathbb{E}_{q_n}[|q_n|^2] = d_n \mathbb{E}_{\mathcal{Y}_n}[|\mathcal{Y}_n|^2], \quad (3)$$

$$\mathbb{E}_{\mathcal{Y}_n q_n}[\mathcal{Y}_n q_n^*] = -d_n \mathbb{E}_{\mathcal{Y}_n}[|\mathcal{Y}_n|^2], \quad (4)$$

Where $d_n$ is the distortion factor of the quantizer $Q_{b_n}(\cdot)$, approximated as:

$$d_n = \frac{\mathbb{E}_{q_n}[\mathcal{R}(q_n)^2]}{\mathbb{E}_{y_n}[\mathcal{R}(y_n)^2]} = \frac{\mathbb{E}_{q_n}[\mathcal{I}(q_n)^2]}{\mathbb{E}_{y_n}[\mathcal{I}(y_n)^2]} \approx \frac{\pi\sqrt{3}}{2} 2^{-2b_n}. \quad (5)$$

Generalized Mutual Information

Computing the mutual information between the input and output of the multi-antenna system model described above is difficult since derivation of the probability distribution function of the quantized output signal is complicated. As a result, the optimal signaling is unknown except for the 1-bit SISO case where on-off QPSK signaling is known to be optimal. To simplify that analysis a GMI (general mutual information) metric is adopted in lieu of mutual information as it has previously been shown to be useful in studying the performance of low resolution ADC systems.

To apply the GMI metric it is assume that: i) Gaussian signaling is used at the user, i.e. $x \sim \mathcal{CN}(0, P)$ and ii) the BBU (see FIG. 1) applies a linear beamforming vector to the quantized signal $r=[r_1, r_2, \ldots, r_n]^T$ it receives from the front-haul link, and subsequently uses nearest-neighbor decoding. The achieved GMI, as a function of the beamforming vector and the quantization bits $b=[b_1, b_2, \ldots, b_N]^T$, is $$I_{GMI}(w, b) = \log_2\left(1 + \frac{\rho(w, b)}{1 - \rho(w, b)}\right), \quad (6)$$

where $$\rho(w, b) = \frac{1}{P} \frac{|\mathbb{E}_{x,z,q}[w^* r x]|^2}{\mathbb{E}_{x,z,q}[|w^* r|^2]} = \frac{1}{P}\left(\frac{w^* R_{rx} R_{rx}^* w}{w^* R_{rr} w}\right) \quad (7)$$

The GMI serves as a reasonable lower bound on the channel capacity. Henceforth, the GMI is used to express the SE (spectral efficiency).

Mixed-ADC Optimization

For at least some embodiments, the mixed ADC pool is optimized using two performance metrics, i.e., SE (spectral efficiency) and EE (energy efficiency). To this end, the GMI is first approximated in (6) assuming the low SNR. The low SNR regime is not only analytical friendly to a low resolution ADC system, but also it is appropriate for a low resolution ADC system since it is known that the performance gap between the infinite resolution ADC and the low resolution ADC becomes negligible as the SNR goes to 0.

Spectral Efficiency Maximization

The problem of maximizing the SE via the used ADC bit resolution $b=[b_1, b_2, \ldots, b_N]^T$ at the RRH can be formulated as:

$$\text{SE optimization: } b^* = \text{argmax} I_{GMI}(w, b) \quad (8)$$

$$b_n \in \{1, 2, \ldots\}$$

$$b^T 1_N \leq C$$

The solution of the above problem provides a guideline that which ADC should be selected in the mixed-ADC pool depending on the channel gain and the front-haul capacity. To address (8), the following approximation is put forth that is useful to solve the problem:

Proposition 1. In the low SNR regime, that is, $P \rightarrow 0$, the GMI with the optimal combiner $w_{opt}$ can be approximated as;

$$I_{GMI}(w_{opt}, b) \cong P \Sigma_{n=1}^N (1-d_n)|h_n|^2, \quad (9)$$

where $w_{opt} = R_{rr}^{-1} R_{rx}^*$.

Substituting (5) into Proposition 1, the SE maximization problem of (8) is transformed to;

$$b^* = \text{argmax} P \sum_{n=1}^N \left(1 - \frac{\pi\sqrt{3}}{2} 2^{-2b_n}\right)|h_n|^2$$

$$b_n \in \{1, 2, \ldots\}$$

$$b^T 1_N \leq C$$

$$b^* = \text{argmin} P \sum_{n=1}^N 2^{-2b_n}|h_n|^2$$

$$b_n \in \{1, 2, \ldots\}$$

$$b^T 1_N \leq C$$

Relaxing the constraint to the set of real numbers and using $\lceil b_n^* \rceil$ as the final solution, it is clear that the objective function is convex and the Lagrangian function is computed as;

$$L_{SE}(b, \mu) = \Sigma_{n=1}^N 2^{-2b_n}|h_n|^2 + \mu(\Sigma_{n=1}^N b_n - C). \quad (11)$$

where $\mu$ is the Lagrangian multiplier. The KKT conditions are;

$$\frac{\partial L_{SE}(b, \mu)}{\partial b_m} = -2\ln 2 \cdot 2^{-2b_m}|h_m|^2 + \mu = 0, \quad (12)$$

$$\frac{\partial L_{SE}(b, \mu)}{\partial \mu} = \sum_{n=1}^N b_n - C = 0. \quad (13)$$

Solving the first KKT condition (12), the optimal ADC selection at the mth antenna satisfies;

$$b_m^* = \frac{1}{2}\log_2\left(\frac{\ln 2|h_m|^2}{\mu}\right) \quad (14)$$

Applying the second KKT condition (13) to (14) to eliminate $\mu$ leads to the final answer;

$$b_m^* = \left(\frac{C}{N} + \frac{1}{2}\log_2|h_m|^2 - \frac{1}{N}\sum_{n=1}^N \log_2|h_m|^2\right)^+ \quad (15)$$

where an output of $(\cdot)^2$ is max $(\cdot, 0)$. Obviously, this is because the ADC resolution bits cannot be negative. An implication of the above solution is that assigning higher resolution ADCs to stronger channels is beneficial in maximizing the SE.

Remark 1. Since $\lceil b_n^* \rceil$ used as the final solutions, it is possible that $\lfloor b_n \rfloor^* = 0$. In this case, the nth antenna chain is not connected to any ADC, so that $\mathcal{Y}_n$ is not used for decoding the transmitted symbol $\mathcal{X}$. For this case, simply set $\mathcal{Y}_n = 0$ and $r_n = 0$.

Corollary 1. In the massive MIMO regime, i.e. $N \to \infty$, each antenna chain can determine its optimal ADC bit resolution using its own channel to the user.

Proof This observation stems from applying the law of large numbers to (15):

$$b_m^* \stackrel{N \to \infty}{\cong} \frac{C}{N} + \frac{1}{2}\log_2|h_m|^2 - \frac{1}{2}\mathbb{E}_h[\log_2|h|^2], \quad (16)$$

Where h denotes a generic coefficient. Note that the last term in (16) is a constant that depends on the channel statistics. For example, for a Rayleigh fading scenario, i.e., $h_m \sim \mathcal{CN}(0,1)$, this term equals $\frac{1}{2}\gamma$ where $\gamma$ is the Euler-Mascheroni constant defined as $\gamma \cong 0.5772$.

The optimal ADC criterion (15) was obtained in the low SNR regime. In the following corollary, assuming a large number of antennas at the RRH, high SNR, and MRC, it is shown that the ADC criterion for maximizing a lower bound on the SE is equivalent to (15).

Corollary 2. Assuming $N \to \infty$, $P \to \infty$, w=h, and Rayleigh fading, the ADC criterion for maximizing a lower bound on the SE is equal to (15).

Corollary 2 implies that the solution in (15) holds not only in the low SNR regime, but also in high SNR regime when $N \to \infty$ if MRC is used.

Finally, as an extension, a multi-user system can be considered, where K>1 users transmit signals to the RRH. Denoting $\mathcal{X}_k$ as the random transmit symbol from the user k and $h_{nk}$ as the channel coefficient between user k and the nth antenna chain, and modifying the analogue signal model in (1) as follows:

$$\mathcal{Y}_n = \sum_{k=1}^{K} h_{nk} x_k + z_n \quad (17)$$

Assuming that the rest part of the system model is identical to the single-user case, the ADC selection criterion for the multi-user system model is provided in the following corollary:

Corollary 3. In the low SNR regime, i.e., $P \to 0$, the optimal ADC selection criterion that maximizes the GMI for a system with K users is:

$$b_m^* = \left(\frac{C}{N} + \frac{1}{2}\log_2\left(\sum_{k=1}^{K}\log_2|h_{mk}|^2\right) - \frac{1}{N}\sum_{n=1}^{N}\log_2\sum_{k=1}^{K}|h_{nk}|^2\right) \quad (18)$$

Proof. In regard to the correlation matrix for user k, one has $R_{x_k y} = P[h_{1k}^*, \ldots, h_{Nk}^*]$, $\mathbb{E} X_n Z_n [\mathcal{Y}_n|^2] = P\sum_{k=1}^{K}|h_{nk}|^2 + 1$, and $\mathbb{E} X_n Z_n Z_m [\mathcal{Y}_n \mathcal{Y}_m^*] = P\sum_{k=1}^{K} h_{nk} h_{mk}^*$. Denoting the GMI (using $w_{opt}$) for user k as $I_{GMI}^k(w_{opt}, b)$, an approximate of the aggregate GMI in the low SNR regime can be obtained by following the same process outlined in the proof of Proposition 1.

$$I_{GMI}^k(w_{opt}, b) \cong \sum_{k=1}^{K}\sum_{n=1}^{N} P(1-d_n)|h_{nk}|^2 \quad (19)$$

$$= \sum_{n=1}^{N} P(1-d_n)\left(\sum_{k=1}^{K}|h_{nk}|^2\right)$$

The corresponding optimization problem is then;

$$b^* = \operatorname{argmin}\sum_{n=1}^{N} 2^{-2b_n}\left(\sum_{k=1}^{K}|h_{nk}|^2\right),$$

$$b_n \in \{1, 2, \ldots\}$$

$$b^T 1_N \le C$$

which directly leads to the solution in (18).

Energy Efficiency Maximization

Now EE maximization is addressed, wherein the EE measures how many bits can be successfully decoded per Joule, i.e., bits/Joule. Define the uplink energy efficiency as;

$$EE = \frac{WR}{P_{tot}} \text{(bits/Joule)}, \quad (20)$$

where R is the SE, W is the operating bandwidth, and $P_{tot}$ is the total power consumed by the hardware of the RRH including ADCs, low noise amplifiers, mixers, etc. Note that $P_{tot}$ does not include the transmit power P since an uplink is not considered. To concentrate on the ADC, the total power consumption is defined as;

$$P_{tot} = \sum_{n=1}^{N} P_{ADC}(b_n) + P_{other}, \quad (21)$$

where $P_{ADC}(b)$ is the power consumption by b resolution ADC and $P_{other}$ is the power consumption by other devices. Treating the $P_{other}$ as a constant, the ADC power consumption $P_{ADC}(b)$ is defined as;

$$P_{ADC}(b) = 2F_W f_s \cdot 2^b, \quad (22)$$

where $F_W$ is Waldens figure-of-merit, $f_s$ is the Nyquist rate, and $b \ge 1$. If b=0, $P_{ADC}=0$.

The EE maximization problem is formulated as;

$$\text{EE optimization: } b^* = \operatorname{argmax}\frac{I_{GMI}(w, b)}{\sum_{n=1}^{N} 2F_W \cdot \frac{f_s}{W} \cdot 2^b + P_{other}/W} \quad (24)$$

$$b_n \in \{1, 2, \ldots\}$$

$$b^T 1_N \le C$$

For convenience, define $F_W' = F_W f_s/W$ and $P_{other}' = P_{other}/W$. Unlike the SE maximization, it is not easy to get a global optimal solution since the EE maximization (24) is not convex. To resolve this, it is first observe that the numerator of (24) is concave, while the denominator is convex for $b_n$ for $n \in \{1, \ldots, N\}$. Further, they are both differentiable and nonnegative. This observation means that the EE maximization problem (24) is included in a class of pseudo-concave function, whose solutions can be efficiently found from the KKT condition. Similar to the SE maximization, the Lagrangian function is;

$$L_{EE}(b, \mu) = \frac{P\sum_{n=1}^{N}\left(1 - \frac{\pi\sqrt{3}}{2}2^{-2b_n}\right)|h_n|^2}{\sum_{n=1}^{N} 2F_W' 2^{b_n} + P_{other}'} + \mu\left(\sum_{n=1}^{N} b_n - C\right), \quad (25)$$

Where μ is the Lagrangian multiplier. Based on this, the KKT conditions are obtained as follows;

$$\frac{\partial L_{EE}(b,\mu)}{\partial b_m} = \partial \left( \frac{P \sum_{n=1}^{N} \left(1 - \frac{\pi\sqrt{3}}{2} 2^{-2b_n}\right)|h_n|^2}{\sum_{n=1}^{N} 2F'_W 2^{b_n} + P'_{other}} \right) / \partial b_m + \mu = 0, \quad (26)$$

$$\frac{\partial L_{EE}(b,\mu)}{\partial \mu} = \sum_{n=1}^{N} b_n - C = 0 \quad (27)$$

Unfortunately, directly solving (26) seems not feasible since the variables are highly coupled. To address this, an iterative approach is exploited. First calculate (26) as follows;

$$L_{EE}(b,\mu) = \frac{P|h_m|^2 \sqrt{3}\pi \ln 2 \cdot 2^{-(b_n)} \left(\sum_{n=1}^{N} 2F'_W 2^{b_n} + P'_{other}\right) - F'_W \ln 2 \cdot 2^{b_n} \left(P\sum_{n=1}^{N}\left(1 - \frac{\pi\sqrt{3}}{2} 2^{-2b_n}\right)|h_n|^2\right)}{\left(\sum_{n=1}^{N} 2F'_W 2^{b_n} + P'_{other}\right)^2} + \mu = 0 \quad (28)$$

Then defining;

$$\sum_{n=1}^{N} 2F'_W 2^{b_n} + P'_{other} = C_p, \quad (29)$$

$$P\sum_{n=1}^{N}\left(1 - \frac{\pi\sqrt{3}}{2} 2^{-b_n}\right)|h_n|^2 = C_s. \quad (30)$$

$C_p$ and $C_s$ as are treated as constant values while solving (28). With $C_p$ and $C_s$, (28) is rewritten as;

$$L_{EE}(b,\mu) = \frac{P|h_m|^2 \sqrt{3}\pi \ln 2 \cdot 2^{-(b_n)} C_p - F'_W \ln 2 \cdot 2^{b_m} C_s}{C_p^2} + \mu = 0 \quad (31)$$

By changing a variable $2^{b_n} = \mathcal{X}$, (31) is a third-order polynomial equation, which can be solved numerically. One caveat is that there are three complex value solutions. Since $b_n$ is a positive real value, the solution is picked that satisfies i) its imaginary part is zero, ii) its real value is positive, iii) it has the minimum real value among the solutions. If there is no such solution, it is assume that $\tilde{b}_n^* = 0$ ($2^{\tilde{b}_n^*} = 1$), where $\tilde{b}_n^*$ denotes that the approximated solution of (31). The next step is adjusting the solution of (31) by decreasing the Lagrangian multiplier μ so as to satisfy the constraint of (24), i.e., $\Sigma_{n=1}^{N} \tilde{b}_n^* \leq C$. After obtaining $\tilde{b}_n^*$, $C_p$ and $C_s$ are updated as follows;

$$C_p(n) \leftarrow \begin{cases} \text{if } \tilde{b}_n^* > 0, & 2F'_W 2^{\tilde{b}_n^*} \\ \text{if } \tilde{b}_n^* = 0, & 0 \end{cases} \quad (32)$$

$$C_p = \sum_{n=1}^{N} C_p(n) + P'_{other} \quad (33)$$

$$C_p(n) \leftarrow \begin{cases} \text{if } \tilde{b}_n^* > 0, & P\left(1 - \frac{\pi\sqrt{3}}{2} 2^{-\tilde{b}_n^*}\right)|h_n|^2 \\ \text{if } \tilde{b}_n^* = 0, & 0 \end{cases} \quad (34)$$

$$C_s = \sum_{n=1}^{N} C_s(n). \quad (35)$$

The rationale behind this update is that when $\tilde{b}_n^* = 0$, the nth antenna chain is not connected to any ADC, which means that the power consumption and the spectral efficiency corresponding to the nth received signal is 0. Then the whole procedure is repeated iteratively until the exit criterion is satisfied. When the final solution $b_n^*$, $n \in \{1, \ldots, N\}$ is obtained after finishing the iteration, $\lfloor (b_n^*)^+ \rfloor$ is used similar to the SE maximization. Algorithm 1 summarizes the total process. Note that it is assumed that the initial point of the algorithm is $b = 1_N^T$.

As stated in Remark 1, it is possible that $\lfloor b_n^* \rfloor = 0$. Similar to the SE maximization, in this case the signal received at the nth antenna chain is not used for decoding the transmitted symbol X, i.e., $\mathcal{Y}_n =$ and $r_n = 0$.

Numerical Results

Here, numerical results are provided. For the simulation, a single user uplink cloud-RAN with N=128 is assumed and Rayleigh fading. All the simulations are performed by the Monte-Carlo fashion, so that the average values are presented as the results. Table 1 shows processing steps of the simulation.

TABLE 1

Processing of Selecting ADC to Maximize EE initialize: $b^{(0)} = 0$, $b^{(1)} = 1_N^T$, $\epsilon$, μ, $\mu_{init}$, and δ
Set the iteration count t = 1.
while $\|b^{(t-1)} - b^{(t)}\| > \epsilon$ do
  Update $C_p$ and $C_s$ according to (32) ~ (35) by $\tilde{b}_n^* = b_n^{(t)}$ for $n \in \{1, \ldots, N\}$
  μ ← $\mu_{init}$
  while $\Sigma_{n=1}^{N} b_n^{(t)} \leq C$ do
    for n = 1:N do $$\text{Solve } \frac{P|h_n|\sqrt[2]{3}\pi\ln 2 \cdot 2^{-(b_n)} C_p - F'_W \ln 2 \cdot 2^{b_n} C_s}{c_p^2} + \mu = 0$$

Pick a solution where i) its imaginary part is zero, ii) its real value is
positive, iii) it has the minimum real value among the solutions and denote such solution as $\tilde{b}_n^*$.
If there is no satisfying solution, $\tilde{b}_n^* \leftarrow 0$.

TABLE 1-continued

Processing of Selecting ADC to Maximize EE $b_n^{(t)} \leftarrow \tilde{b}_n$
   end for
   $\mu \leftarrow \mu - \delta$
   end while
   $t \leftarrow t + 1$
end while
$b^* \leftarrow b^{(t)}$
output: $\lfloor (\tilde{b}_n)^+ \rfloor$ for $n \in \{1, \ldots, N\}$ Four (4) cases of ADC systems are considered, each of which is the infinite resolution ADC, the proposed ADC selection, the equal ADC selection, and the mixed ADC with 1/∞ bit resolution. In the infinite resolution ADC, it is assume that there is no front-haul capacity constraint and each antenna is connected to an infinite resolution ADC. This case provides an upper bound on the spectral efficiency. In the proposed ADC selection, an ADC is selected by using the obtained criterion (15). In the equal ADC selection, each antenna uses the same resolution ADC, i.e., $$\left\lfloor \frac{C}{N} \right\rfloor.$$

In me mixed ADC with 1/∞ bit resolution, it is assumed that two kinds of ADCs, i.e., 1 bit ADC and ∞ bit ADC are in the mixed-ADC pool. Since ∞ bit ADCs cannot be supported by limited capacity front-haul, ∞ bit ADCs are approximated by $p_\infty$ bit ADCs ($p_\infty < \infty$). K antennas are connected to $p_\infty$ bit ADCs, while N-K antennas are connected to 1 bit resolution ADCs. The feasible condition of K is obtained as follows;

$$Kp_\infty + (N - K) \le C \leftrightarrow K \le \frac{C - N}{p_\infty - 1}. \tag{36}$$

Choosing $$K = \left\lfloor \frac{C - N}{p_\infty - 1} \right\rfloor,$$

so that as many as possible $p_\infty$ bit ADC can be used. These K high resolution ADCs are connected to K strongest channel. In the simulation, it is assumed that $p_\infty = 7$.

In the SE maximization, the GMI is compared in (6) for 4 ADC systems depending on the front-haul capacity C. The correlation matrices required to obtain the GMI, i.e., $R_{rX}$ and $R_{rr}$, are calculated by using the same technique in the proof of Proposition 1, while not particularly approximating the GMI as in Proposition 1. Two cases are considered, where each case uses $w_{opt} = R_{rr}^{-1} R_{rX}$ and $w_{mrc} = h$, respectively. When considering a large array antenna, calculating an inverse of $R_{rr}$ is a demanding operation, which motivates use of MRC as an efficient alternative.

Figure 4A:
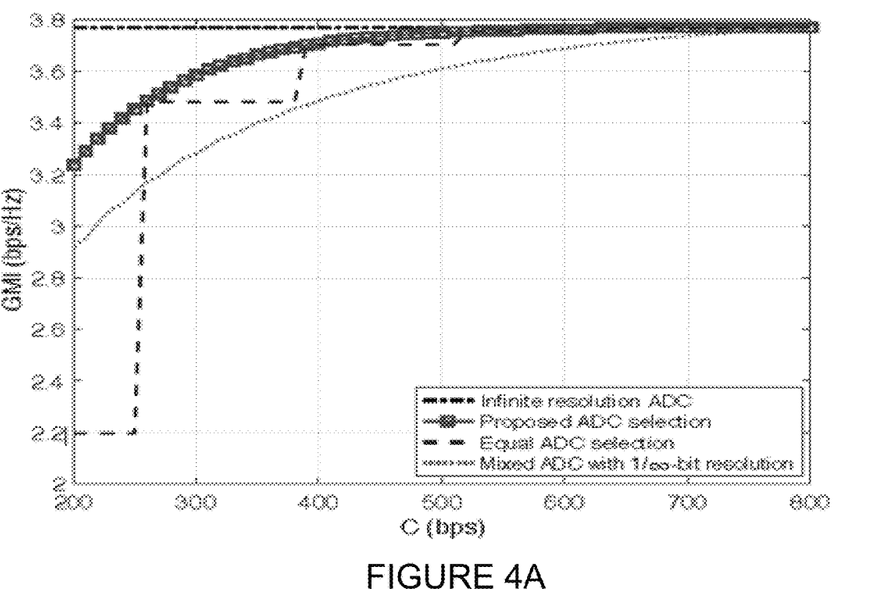
FIG. 4A is a plot of GMI (Generalized Mutual Information) for four different low-noise ADC systems using a first set of conditions, according to an embodiment.
Figure 4B:
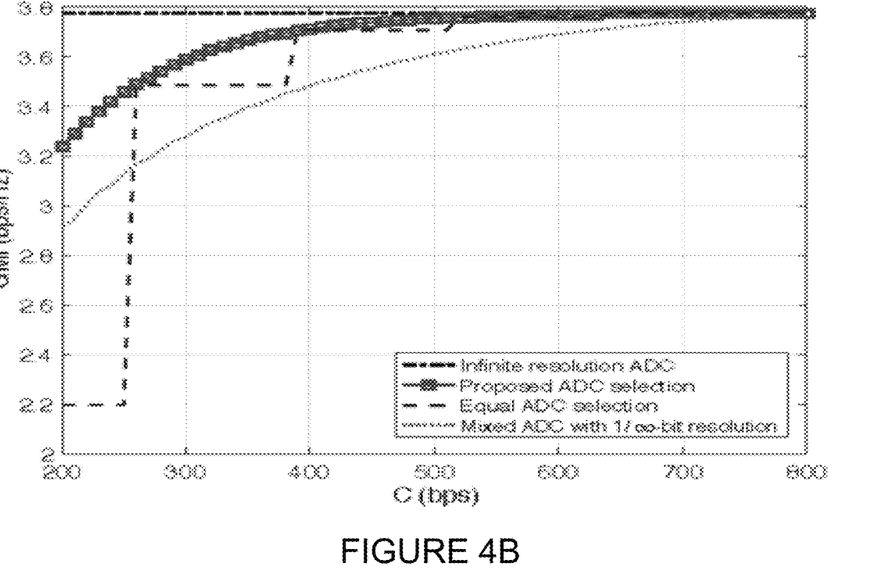
FIG. 4B is a plot of GMI for four different low-noise ADC systems using a second set of conditions, according to an embodiment.

FIG. 4A is a plot of GMI (Generalized Mutual Information) for four different low-noise ADC systems using a first set of conditions, according to an embodiment. FIG. 4B is a plot of GMI for four different low-noise ADC systems using a second set of conditions, according to an embodiment. More specifically, FIGS. 4A, 4B illustrate the GMI in the low SNR regime, i.e., P=-10 dB while FIG. 4A uses $w_{opt}$ and FIG. 4B uses $w_{mrc}$. FIGS. 4A, 4B provide a GMI comparison for 4 ADC systems in P=-10 dB. For FIG. 4A, $w_{opt} = R_{rr}^{-1} R_{rX}$ is used and in FIG. 4B $w_{mrc} = h$ is used. For both cases, the proposed ADC selection provides observable gain.

As observed in the FIGS. 4A, 4B, the proposed ADC selection provides observable gain over the equal ADC selection and the mixed ADC with 1/∞ bit resolution. Specifically, when C=200 bps and $w_{opt}$ is used, the proposed ADC selection improves the SE by 9.6% compared to the mixed ADC with 1/∞ bit resolution and by 45% compared to the equal ADC selection. As expected, this is because the proposed ADC selection is able to deal with fluctuating channel gain of each antenna chain more flexibly compared to other cases. One point is that FIGS. 4A, 4B have no significant difference, which means that MRC is near optimal receive filter in the low SNR regime. This is because, when the SNR is low, the additive Gaussian noise mainly affects the performance, while the quantization noise becomes relatively negligible. Ignoring the quantization noise, the optimal receive filter is MRC in single-user systems.

Figure 5A:
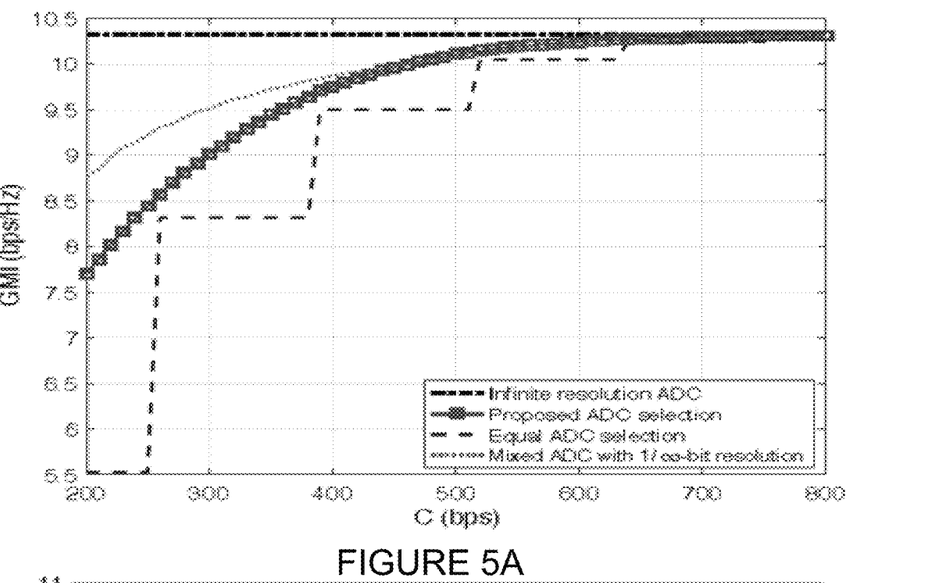
FIG. 5A is a plot of GMI for four different high-noise ADC systems using a first set of conditions, according to an embodiment.
Figure 5B:
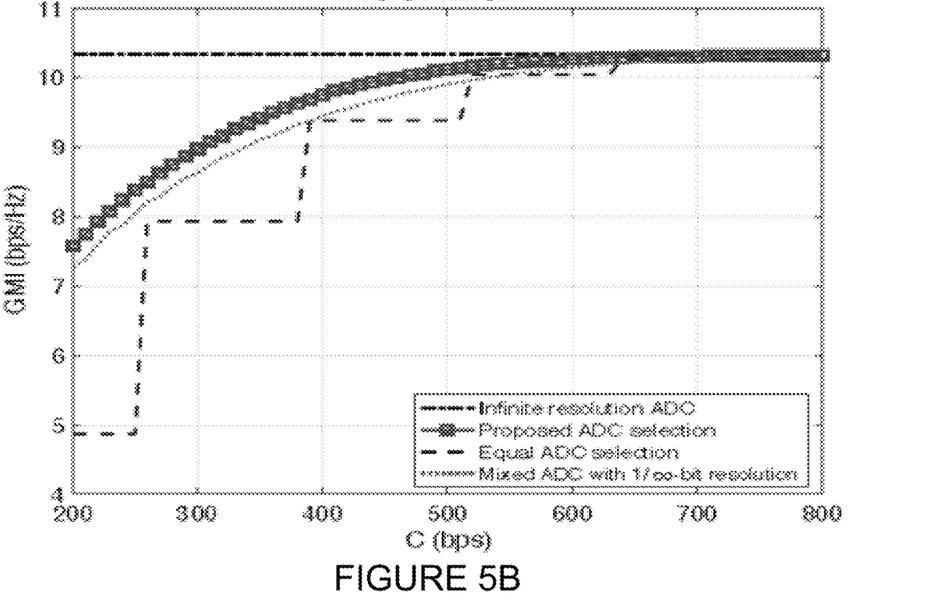
FIG. 5B is a plot of GMI four different high-noise ADC systems using a second set of conditions, according to an embodiment.

FIG. 5A is a plot of GMI for four different high-noise ADC systems using a first set of conditions, according to an embodiment. FIG. 5B is a plot of GMI four different high-noise ADC systems using a second set of conditions, according to an embodiment. FIGS. 5A and 5B provide GMI comparison for 4 ADC systems when P=10 dB. For FIG. 5A, $w_{opt} = R_{rr}^{-1} R_{rX}$ is used and in FIG. 5B, $w_{mrc} = h$ is used. In the case where MRC is used, the proposed ADC selection provides observable gain.

For FIG. 5A, the mixed ADC with 1/∞ bit resolution has better GMI than the proposed ADC selection, while in FIG. 5B, the proposed ADC selection has the performance gain over the mixed ADC with 1/∞ bit resolution. This implies that in the high SNR regime with $w_{opt}$ a different ADC selection criterion is required to improve the SE, which opens the possible future extension of this work. In the high SNR regime with $w_{mrc}$, the proposed ADC selection is still useful as shown in Corollary 2. In FIG. 5B, it can be observed that the proposed ADC selection has 5% gain compared to the mixed ADC with 1/∞ bit resolution and 37.5% gain compared to the equal ADC selection.

Figure 6:
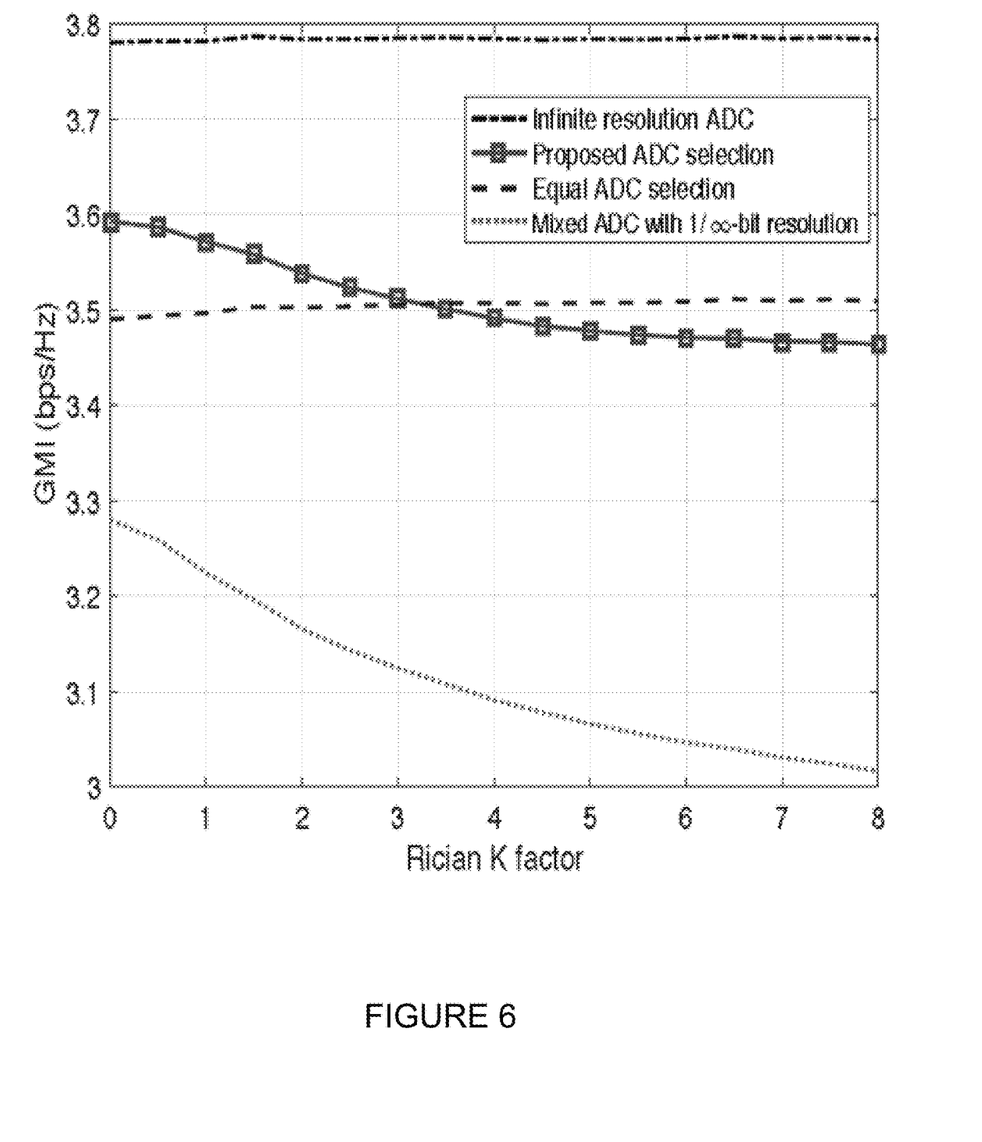
FIG. 6 is a plot of GMI for four different ADC systems that are dependent on a Rician K factor, according to an embodiment.

FIG. 6 is a plot of GMI for four different ADC systems that are dependent on a Rician K factor, according to an embodiment. FIG. 6 includes a GMI comparison for 4 ADC systems depending on Rician K factor assuming P=10 dB and C=300 bps. The GMI is plotted in a different channel environment, i.e., Rician fading. Denoting h as a channel coefficient vector in Rayleigh fading, $h_n \sim CN(0,1)$ for $n \in \{1, \ldots, B\}$. Then Rician channel coefficients are made as $$h_{Rician} = \sqrt{\frac{1}{K+1}} h + \sqrt{\frac{K}{K+1}} h_{LoS} \qquad (37)$$

where K means the Rician K factor for K>0 and $h_{LoS}$ is the line-of-sight (LoS) channel defined as;

$$h_{LoS}=[1, \ldots, e^{j\pi(n-1)sin(\theta_{AoA})}, \ldots, e^{j\pi(N-1)sin(\theta_{AoA})}]. \qquad (38)$$

$\theta_{AoA}$ is angle-of-arrival. It is assumed that $$\theta_{AoA} = \frac{\pi}{4}$$

in the simulation. FIG. 6 depicts the GMI depending on the Rician K factor in P=−10 dB and C=300 bps. As the K factor increases, the GMI of the proposed ADC selection and the mixed ADC with 1/∞ bit resolution decreases, while the GMI of the equal ADC selection slightly increases. In detail, the mixed ADC with 1/∞ bit resolution has more large decreasing rate than that of the proposed ADC selection. The reasonable explanation of this observation is as follows. When the K factor increases, the channel gain becomes flat since the LoS channel component becomes dominant. When the channel gain is flat, using equal resolution ADC to each antenna chain is the optimal. In the mixed ADC with 1/∞ bit resolution, however, there are only two choices of ADCs, so adapting to the flat channel is difficult. This brings the significant performance degradation. In the proposed ADC selection, the diversity gain obtained from the fluctuating channel gain decreases when the channel gain is flat, so the GMI also decreases. One might still wonder that why the GMI of the proposed ADC selection decreases even below than that of the equal ADC selection. This is because the floor version of the optimal criterion is used, i.e., [$b_n$*], not the exact optimal value.

Figure 7:
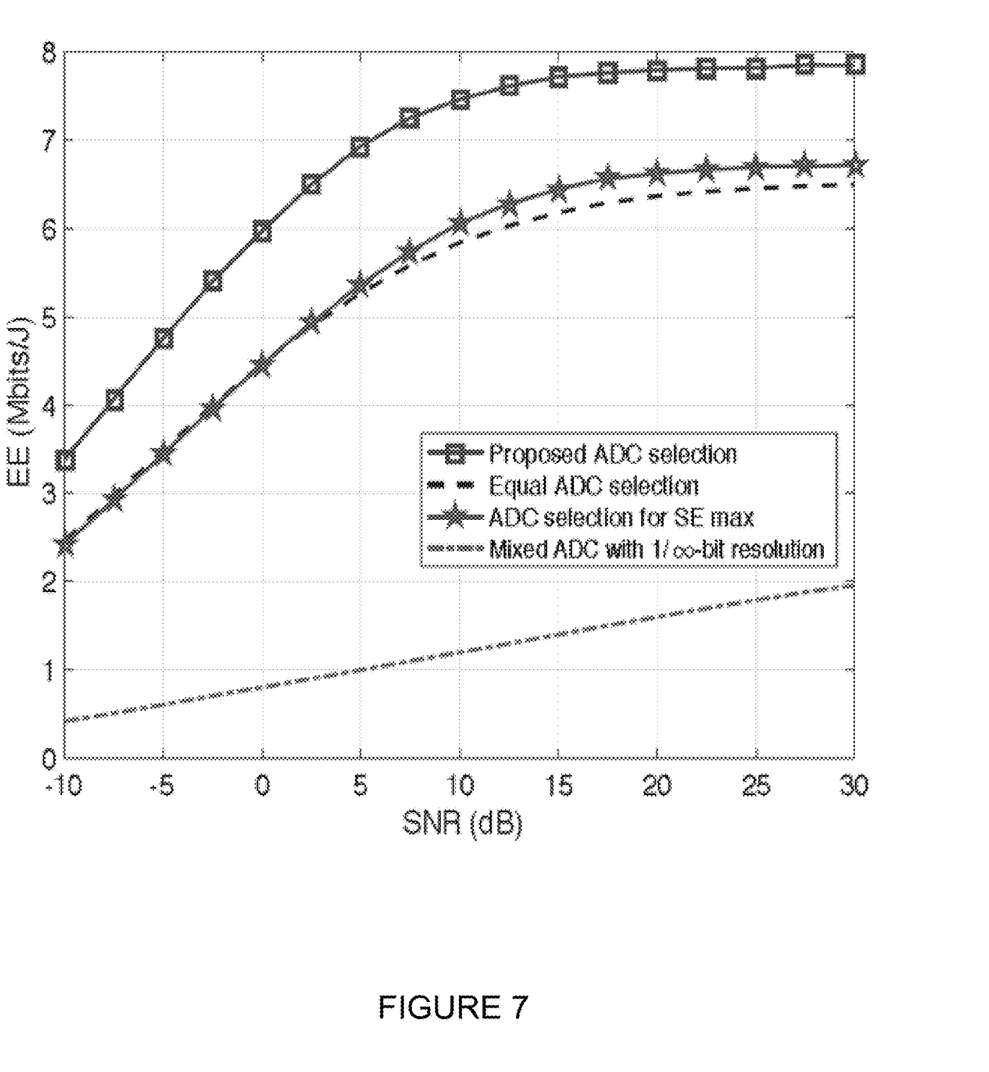
FIG. 7 is a plot of EE (energy efficiency) for four different ADC systems depending on SNR (signal to noise ratio), according to an embodiment.

FIG. 7 is a plot of EE (energy efficiency) for four different ADC systems depending on SNR (signal to noise ratio), according to an embodiment. FIG. 7 provides EE comparisons for 4 ADC systems depending on the SNR in C=300 bps, $F_W'=10^{-9}$ Watt/conversion-step/Hz, and $P_{other}'=4\times10^{-7}$ Watt/Hz. For parameters of the processing of Table 1, it is assumed that ∈=1, $\mu_{init}$=0, and δ=0.001.

EE maximization can be investigated by considering 4 ADC systems, i.e., the proposed ADC selection of the processing of Table 1, the equal ADC selection, the ADC selection used in the SE maximization (15), and the mixed ADC with 1/∞ bit resolution. The setting of the mixed ADC with 1/∞ bit resolution is same with the SE maximization case. The EE is plotted depending on the SNR. The GMI in (6) is used as the SE, where calculating the correlation matrix follows the same method with the SE maximization. Other system parameters given in the simulation is as follows: C=300 bps, $F_W'=10^{-9}$ J/conversion step/Hz, and $P_{other}=4\times10^{-7}$ J/Hz. For parameters in the processing of Table 1, it is assumed that $\epsilon$=1, $\mu_{init}$=0, and δ=0.001. FIG. 7 provides the simulation results. As observed in the FIG. 7, the proposed ADC selection (processing of Table 1) has considerable gain over other ADC systems, specifically 30% gain compared to the equal ADC selection and the ADC selection for SE maximization and 650% gain compared to the mixed ADC with 1/∞ bit resolution. In the simulation, it is observed that the proposed ADC selection (processing of Table 1) does not fully use the given front-haul capacity. For example, the sum of the ADC resolution bit in the proposed ADC selection is about 150 even though they can use higher resolution ADC up to 300. As the used ADC resolution bit increases, the SE would increase but the increasing rate of the power consumption is faster than that of the SE due to the forms of $P_{ADC}(b)$. In particular, the power consumption by the ADCs exponentially increases with the resolution bit b. This results in that the EE decreases eventually. For this reason, the processing of Table 1 gradually cuts down the ADC resolution bit to improve the EE as the iteration is progressed. This observation means that considering the EE, large front-haul capacity does not necessarily guarantee large EE without a proper ADC selection strategy. The characteristic of $P_{ADC}(b)$ is a fatal handicap to the mixed ADC with 1/∞ bit resolution. Using a high resolution ADC ($p_\infty$ bit resolution) consumes huge power, so that its EE is significantly low compared to the other ADC systems even if its SE is comparable. Summarizing, the key intuition is that the ADC system of the described embodiments has an advantage for improving the SE, but also has a crucial benefit for improving the EE by using low resolution ADCs flexibly. By doing this, the ADCs are selected to improve the SE performance while managing the power consumption accordingly.

At least some of the described embodiments include low resolution ADC selection in a massive MIMO C-RAN. The GMI has been characterized in a low SNR regime as a function of the ADC resolution bits and the channel gain, and the SE and the EE maximization problem has been formulated. When considering the SE maximization, it is advantageous to select the ADC resolution bits proportional to the channel gain. For the EE maximization, balancing the ADC bits brings the EE gain.

Although specific embodiments have been described and illustrated, the embodiments are not to be limited to the specific forms or arrangements of parts so described and illustrated. The described embodiments are to only be limited by the claims.

What is claimed:

1. A remote radio head unit (RRU), comprising:
   a plurality of antennas connected to a plurality of RF (radio frequency) chains configured to receive a plurality of wireless signals;
   a plurality of analog-to-digital converters (ADCs) having a plurality of ADC resolutions;
   a plurality of outputs of the RRU connected to a front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul;
   a controller configured to select a one of the plurality of ADCs having the plurality of ADC resolutions for each of the plurality of RF chains based on the capacity of the front-haul, a channel gain of each of the plurality RF chains, and a performance parameter of the RRU; and
   a switch that connects each of the plurality of RF chains to the corresponding selected one of the plurality of ADCs.

2. The RRU of claim 1, wherein the capacity of the front-haul represents a limit on the bit-rate of the front-haul.

3. The RRU of claim 1, wherein the performance parameter of the RRU includes a spectral efficiency of the received plurality of wireless signals.

4. The RRU of claim 3, wherein selecting the one of the plurality of ADCs based on the capacity of the front-haul, the channel gain of each of the plurality of RF chains, and the spectral efficiency of the received plurality of wireless signals, includes selecting an ADC having the highest resolution for a one of the plurality of RF channels corresponding with the strongest received signal.

5. The RRU of claim 3, wherein selecting the one of the plurality of ADCs based on the capacity of the front-haul, the channel gain of each of the plurality of RF chains, and the spectral efficiency of the received plurality of wireless signals, includes selecting a higher resolution ADC for a one of the plurality of RF chains that has a stronger received signal than a received signal of another one of the plurality of RF chains.

6. The RRU of claim 1, wherein the performance parameter of the RRU includes an energy efficiency of bits per unit of energy of the RRU.

7. The RRU of claim 6, wherein selecting the one of the plurality of ADCs based on the capacity of the front-haul, the channel gain of each of the plurality of RF chains, and the energy efficiency of bits per unit of energy of the RRU, includes selecting a resolution of an ADC for at least one of the RF chains based at least in part on a ratio of channel bandwidth times spectral efficiency to power consumed by the ADC.

8. A cloud radio access network (RAN) system, comprising:
a central baseband unit (BBU);
a plurality of remote radio heads (RRUs), each RRU configured to receive wireless communication signals and communicate the wireless communication signals to the BBU through a front-haul, wherein
one or more of the plurality of RRUs comprises:
a plurality of antennas connected to a plurality of RF (radio frequency) chains configured to receive a plurality of wireless signals;
a plurality of analog-to-digital converters (ADCs) having a plurality of ADC resolutions;
a plurality of outputs of the RRU connected to a front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul;
a controller configured to select a one of the plurality of ADCs having the plurality of ADC resolutions for each of the plurality of RF chains based on the capacity of the front-haul, a channel gain of each of the plurality RF chains, and a performance parameter of the RRU; and
a switch that connects each of the plurality of RF chains to the corresponding selected one of the plurality of ADCs.

9. The RAN system of claim 8, wherein the capacity of the front-haul represents a limit on the bit-rate of the front-haul.

10. The RAN system of claim 8, wherein the performance parameter of the RRU includes a spectral efficiency of the received plurality of wireless signals.

11. The RAN system of claim 10, wherein selecting the one of the plurality of ADCs based on the capacity of the front-haul, the channel gain of each of the plurality of RF chains, and the spectral efficiency of the received plurality of wireless signals, includes selecting an ADC having the highest resolution for a one of the plurality of RF channels corresponding with the strongest received signal.

12. The RAN system of claim 10, wherein selecting the one of the plurality of ADCs based on the capacity of the front-haul, the channel gain of each of the plurality of RF chains, and the spectral efficiency of the received plurality of wireless signals, includes selecting a higher resolution ADC for a one of the plurality of RF chains that has a stronger received signal than a received signal of another one of the plurality of RF chains.

13. The RAN system of claim 8, wherein the performance parameter of the RRU includes an energy efficiency of bits per unit of energy of the RRU.

14. The RAN system of claim 13, wherein selecting the one of the plurality of ADCs based on the capacity of the front-haul, the channel gain of each of the plurality of RF chains, and the energy efficiency of bits per unit of energy of the RRU, includes selecting a resolution of an ADC for at least one of the RF chains based at least in part on a ratio of channel bandwidth times spectral efficiency to power consumed by the ADC.

15. A method, comprising:
receiving, by a plurality of antennas connected to a plurality of RF (radio frequency) chains of a remote radio head unit (RRU), a plurality of wireless signals;
selecting a one of a plurality of ADCs having a plurality of ADC resolutions for each of the plurality of RF chains based on a capacity of the front-haul, a channel gain of each of the plurality RF chains, and a performance parameter of the RRU;
connecting, through switches, each of the plurality of RF chains to a corresponding selected one of the plurality of ADCs; and
connecting each of the selected ADCs to a plurality of outputs of the RRU, wherein the plurality of outputs of the RRU are connected to the front-haul, wherein the front-haul electrically connects the plurality of outputs of the RRU to a baseband unit (BBU), wherein each of the plurality of outputs is connected to an output of one of the plurality of ADCs, and wherein the front-haul comprises a capacity that indicates a bit-rate of the front-haul.

16. The method of claim 15, wherein the performance parameter of the RRU includes a spectral efficiency of the received plurality of wireless signals.

17. The method of claim 16, wherein selecting the one of the plurality of ADCs based on the capacity of the front-haul, the channel gain of each of the plurality of RF chains, and the spectral efficiency of the received plurality of wireless signals, includes selecting an ADC having the highest resolution for a one of the plurality of RF channels corresponding with the strongest received signal.

18. The method of claim 16, wherein selecting the one of the plurality of ADCs based on the capacity of the front-haul, the channel gain of each of the plurality of RF chains, and the spectral efficiency of the received plurality of wireless signals, includes selecting a higher resolution ADC for a one of the plurality of RF chains that has a stronger received signal than a received signal of another one of the plurality of RF chains.

19. The method of claim 15, wherein the performance parameter of the RRU includes an energy efficiency of bits per unit of energy of the RRU.

20. The method of claim 19, wherein selecting the one of the plurality of ADCs based on the capacity of the front-haul, the channel gain of each of the plurality of RF chains, and the energy efficiency of bits per unit of energy of the RRU, includes selecting a resolution of an ADC for at least one of the RF chains based at least in part on a ratio of channel bandwidth times spectral efficiency to power consumed by the ADC.

\* \* \* \* \*